(12) United States Patent
Gerard et al.

(10) Patent No.: US 11,186,723 B2
(45) Date of Patent: *Nov. 30, 2021

(54) LIQUID (METH)ACRYLIC SYRUP, METHOD FOR IMPREGNATING A FIBROUS SUBSTRATE WITH SAID SYRUP, AND COMPOSITE MATERIAL PRODUCED AFTER POLYMERISATION OF SAID IMPREGNATION SYRUP

(71) Applicant: Arkema France, Colombes (FR)

(72) Inventors: Pierre Gerard, Denguin (FR); Sébastien Taillemite, Chaville (FR); Daniel Callin, Caubios-Loos (FR)

(73) Assignee: ARKEMA FRANCE, Colombes (FR)

( * ) Notice: Subject to any disclaimer, the term of this patent is extended or adjusted under 35 U.S.C. 154(b) by 486 days.

This patent is subject to a terminal disclaimer.

(21) Appl. No.: 15/538,927

(22) PCT Filed: Dec. 22, 2015

(86) PCT No.: PCT/FR2015/053725
§ 371 (c)(1),
(2) Date: Jun. 22, 2017

(87) PCT Pub. No.: WO2016/102890
PCT Pub. Date: Jun. 30, 2016

(65) Prior Publication Data
US 2017/0362442 A1    Dec. 21, 2017

(30) Foreign Application Priority Data

Dec. 22, 2014 (FR) .................... 1463056

(51) Int. Cl.
| | | |
|---|---|---|
| *C09D 4/06* | (2006.01) | |
| *C08L 33/06* | (2006.01) | |
| *C09D 133/06* | (2006.01) | |
| *C08F 265/06* | (2006.01) | |
| *C08F 220/14* | (2006.01) | |
| *C08J 5/24* | (2006.01) | |
| *B29C 70/48* | (2006.01) | |
| *C08F 120/14* | (2006.01) | |

(52) U.S. Cl.
CPC ............... *C09D 4/06* (2013.01); *B29C 70/48* (2013.01); *C08F 120/14* (2013.01); *C08F 220/14* (2013.01); *C08F 265/06* (2013.01); *C08J 5/24* (2013.01); *C08L 33/06* (2013.01); *C09D 133/06* (2013.01); *C08J 2333/04* (2013.01)

(58) Field of Classification Search
None
See application file for complete search history.

(56) References Cited

U.S. PATENT DOCUMENTS

| | | | |
|---|---|---|---|
| 3,288,274 A | | 11/1966 | Allan et al. |
| 3,309,424 A | * | 3/1967 | Hitoshi ................ C08F 257/02 427/389.7 |
| 3,476,723 A | * | 11/1969 | Stahl ..................... C08F 265/06 525/360 |
| 3,632,416 A | * | 1/1972 | Shepherd .............. D06M 14/00 442/76 |
| 2008/0295959 A1 | | 12/2008 | Ishigaki et al. |
| 2009/0281258 A1 | * | 11/2009 | Kuang .................... C08K 5/18 526/90 |
| 2010/0297457 A1 | * | 11/2010 | Kramer .................... C08K 5/07 428/480 |
| 2012/0005983 A1 | | 1/2012 | Stephan |
| 2015/0218362 A1 | | 8/2015 | Gerard et al. |
| 2016/0090434 A1 | | 3/2016 | Gerard et al. |

FOREIGN PATENT DOCUMENTS

| | | | | |
|---|---|---|---|---|
| CN | 102558728 | | 7/2012 | |
| GB | 924459 | | 4/1963 | |
| JP | 5968336 | | 8/2016 | |
| WO | WO-2013056845 A2 | * | 4/2013 | ............... C08J 5/24 |

* cited by examiner

Primary Examiner — Matthew J Daniels
(74) Attorney, Agent, or Firm — Buchanan Ingersoll & Rooney P.C.

(57) ABSTRACT

The invention relates to a viscous liquid (meth)acrylic syrup comprising:
a) a (meth)acrylic polymer,
b) a (meth)acrylic monomer,
c) an initiator to start the polymerization of the (meth)acrylic monomer, said initiator being in the form of a peroxide compound that is liquid in a temperature range of between 0° and 50° C.,
said syrup being characterized in that the initiator is combined with an accelerating system comprising:
d) a vanadium salt and
e) a tertiary amine.

18 Claims, No Drawings

LIQUID (METH)ACRYLIC SYRUP, METHOD FOR IMPREGNATING A FIBROUS SUBSTRATE WITH SAID SYRUP, AND COMPOSITE MATERIAL PRODUCED AFTER POLYMERISATION OF SAID IMPREGNATION SYRUP

This application claims benefit, under U.S.C. § 119 or § 365 of PCT Application Number PCT/FR2015/053725, filed Dec. 22, 2015, and French Patent Application Number FR1463056, filed Dec. 22, 2014, these documents being incorporated herein by reference.

FIELD OF THE INVENTION

The invention relates to a viscous liquid (meth)acrylic syrup, to a process for impregnating a fibrous substrate with said syrup, to a process for polymerizing said syrup and to a composite material obtained after polymerization of said substrate preimpregnated with said syrup.

In particular, the present invention relates to a viscous liquid (meth)acrylic syrup mainly comprising methacrylic or acrylic components, to an initiator for starting the polymerization at low temperature and to an accelerator. The invention also relates to an industrial process for impregnating a fibrous substrate or long fibers with such a viscous liquid syrup. Finally, the invention relates to a process for manufacturing three-dimensional composite parts or mechanical objects or objects structured by impregnating a fibrous substrate with such a viscous liquid (meth)acrylic syrup followed by polymerization of said liquid syrup. Such three-dimensional composite parts are intended to be used in varied fields such as aeronautics, motor vehicles, construction, or railway transportation, for example.

PRIOR ART

Mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The object when using a composite material is to obtain performance qualities that are not available from each of its constituents when they are used separately. Consequently, composite materials are widely used in several industrial sectors, for instance building, automotive, aerospace, transport, leisure, electronics, and sport notably due to their better mechanical performance (higher tensile strength, higher tensile modulus, higher fracture toughness) and their low density, in comparison with homogeneous materials.

The most important class, in view of volume at the commercial industrial scale, is that of composites with organic matrices, in which the matrix material is generally a polymer. The matrix of a polymeric composite material is either a thermoplastic polymer or a thermosetting polymer.

Thermosetting polymers consist of crosslinked three-dimensional structures. The crosslinking is obtained by curing reactive groups in a prepolymer. Curing may be obtained, for example, by heating the polymer chains in order to crosslink and harden the material permanently. In order to prepare the polymeric composite material, the prepolymer is mixed with the other component, such as glass beads or fibers, or the other component is wetted or impregnated and cured afterwards. Examples of prepolymers or matrix material for thermosetting polymers are unsaturated polyesters, vinyl esters, and epoxy or phenolic materials.

A major drawback of a thermosetting polymeric matrix is its crosslinking. The matrix cannot be easily fashioned into other forms. Once the polymer has been crosslinked, the form is set. This also makes the recycling of the thermosetting composite material difficult, and manufactured mechanical or structured parts or articles comprising said thermosetting composite material are burned in a cement plant or thrown into a waste dump. Another major drawback of all thermosetting matrices is their fragility.

To allow thermoforming and recycling, it is preferred to use thermoplastic polymers.

Thermoplastic polymers consist of linear or branched polymers, which are not crosslinked or highly crosslinked. The thermoplastic polymers are heated in order to mix the constituents necessary for manufacturing the composite material and are cooled to set the final form. The problem of these molten thermoplastic polymers is their very high viscosity. In order to prepare a polymeric composite material based on thermoplastic polymer, a thermoplastic polymer resin, commonly known as a "syrup", is used to impregnate the reinforcing material, for example a fibrous substrate. Once polymerized, the thermoplastic polymeric syrup constitutes the matrix of the composite material. At the time of impregnation, the viscosity of the impregnation syrup must be controlled and adapted so as not to be too fluid or too viscous, so as to impregnate correctly each fiber of the fibrous substrate. When the wetting is partial, depending on whether the syrup is too fluid or too viscous, "naked" zones, i.e. non-impregnated zones, and zones in which drops of polymer form on the fibers, which are the cause of the creation of bubbles, respectively appear. These "naked" zones and these bubbles give rise to the appearance of defects in the final composite material, which are the cause, inter alia, of a loss of mechanical strength of the final composite material.

Molded objects may be obtained by injecting a liquid syrup into a mold and then polymerizing this liquid syrup comprising a monomer and an initiator to start or initiate the polymerization. Initiators or initiating systems exist, which are activated by heat, i.e. the mold is heated to start the polymerization. Applications also exist in which "cold curing" is necessary or desired, an accelerator usually being added to the liquid syrup. The term "cold curing" means that the polymerization takes place or can start at room temperature, i.e. below 40° C. The mold does not necessarily need to be heated, but may be heated in addition in order to accelerate the kinetics.

Once all the compounds required for the polymerization are combined in the form of a liquid syrup: the monomer, the initiator and the accelerator, the system is active and polymerization will inevitably start after a certain interval. This interval is generally less than 30 minutes. This means that the liquid syrup must be used virtually immediately; it has a very limited pot life.

Consequently, the compounds required for the polymerization, i.e. the monomer, the initiator and the accelerator, are mixed together in the form of a liquid syrup only a few moments just before the injection. This is performed using a two-component injection machine, with a mixing head, just before the injection head. The first component may comprise the monomer(s) and the accelerator, while the second component comprises the initiator, which could also be mixed with the monomer(s). A premature start of polymerization is thus avoided.

In general, for the polymerization of a syrup based on methacrylic or acrylic compounds, the first component comprises a mixture of methacrylic polymer, of methacrylic monomer and of a tertiary amine. The second component, comprising the initiating system, is generally a solid product. It is used in the form of a powder, for example benzoyl peroxide (denoted as BPO hereinbelow). An attempt is made to mix the benzoyl peroxide (BPO) with the monomer. Dissolution of the peroxide powder in the monomer is often incomplete, and the undissolved powder may then sediment out, leading to the production of a non-homogeneous solution. Another problem of solid initiators that are not correctly dissolved lies in the fact that their accumulation in the pipes of an injection machine may cause obstruction of the machine's feed lines, leading to its blocking and immobilization for cleaning, or even to its breakdown.

A first solution may consist in dissolving the initiator in a solvent such as acetone, ethanol or a phthalate, for example, but this gives rise to high costs and the presence of a solvent is not desirable in the processes for manufacturing such composite materials. Furthermore, the amount of solvent required to dissolve the initiator is generally too high and incompatible with the ((meth)acrylic monomer/initiator) ratio of the machines. This is especially the case with benzoyl peroxide (BPO), for which the amount of initiator must not exceed 5% by weight of the syrup.

An alternative solution consists in using a liquid peroxide which makes it possible to initiate the polymerization of the syrup under kinetics that are comparable to those of initiating systems based on solid BPO. Thus, the reaction for polymerization of unsaturated polyester thermosetting resins, for example, can be initiated via a radical route with a methyl ethyl ketone peroxide (MEKP) or a liquid hydroperoxide (HP) in solution. The room-temperature polymerization reaction is then accelerated by means of incorporating a cobalt salt, such as cobalt octoate or cobalt naphthenate, for example. However, this system, comprising an initiator which is in the form of a liquid peroxide and an accelerator which is in the form of a metal salt based on cobalt, does not allow the polymerization of thermoplastic vinyl monomers of acrylate or methacrylate type since degradation of the liquid peroxide generates oxygen in the medium, which then inhibits the polymerization of the methacrylates. Moreover, the activation energy of the methacrylates is not reached with the methyl ethyl ketone peroxides (MEKP).

A solution to this problem may then consist in adding styrene in addition to the (meth)acrylic monomers, but this poses environmental and safety problems and problems of premature aging mediated by ultraviolet rays.

Another solution may consist in adding aldehydes. Thus, WO 2003/008 463 describes a process for polymerizing vinyl monomers and/or oligomers comprising at least one vinyl radical. To this end, the vinyl monomer is mixed with at least one dioxygen-generating agent, at least one aldehyde and at least one accelerator. However, the aldehyde(s) are added in excessive amount, which may be detrimental to the mechanical properties of the final composite part obtained from a fibrous material impregnated with the syrup and polymerized. Furthermore, this solution does not make it possible either to conserve typical dosages of initiator, which are conventionally less than 5% by weight of the syrup, because, since the aldehyde is not stable in the monomer syrup, it needs to be added with the initiator. Finally, these systems may be accelerated by the incorporation of a cobalt salt. However, cobalt is a substance that is classified as toxic, which the Applicant is thus seeking to avoid.

Documents also exist describing two-component formulations for dental applications, for example, which require a system that polymerizes in wet medium. Thus, US 2012/0 059 083 describes a two-component formulation in which a first component A comprises multi-functional methacrylic monomers and oligomers, fillers and cumene hydroperoxide and in which a second component B comprises multi-functional methacrylic monomers and oligomers, fillers, a reducing compound of the thiourea family and a vanadium salt. However, it has been verified, especially on a mixture of 1,4-butanediol dimethacrylate and of epoxy-methacrylate oligomer, that viscous liquid (meth)acrylic syrups, mainly comprising monofunctional methacrylic or acrylic components, are much less reactive than mixtures of multifunctional (meth)acrylic monomers and of oligomers that are known to accelerate the polymerization reaction. Furthermore, the viscosity of the formulation described in said document appears to be high, which may also contribute toward accelerating the reactivity of the composition. Now, it is sought to produce a syrup whose viscosity is not too high, so as to allow complete and correct impregnation of the fibers of a fibrous substrate.

EP 1 997 862 describes a formulation comprising urethane-acrylates, fillers and a vanadium acetonate. Urethane-acrylates are known to be compounds that are much more reactive than monofunctional methacrylic monomers. Furthermore, the viscosity of the formulation described in said document is between 1000 and 10 000 mPa.s. This formulation does not make it possible to obtain rapid polymerization with less viscous syrups based on monofunctional monomers.

U.S. Pat. No. 4,083,890 describes a system comprising a thermosetting resin based on unsaturated polyester (or vinyl ester), a hydroperoxide and vanadium in proportions of between 0.002 and 1% of metal. The addition of a ketone peroxide makes it possible to delay the gelling. The vanadium described is a solution of vanadium neodecanoate containing 6% of vanadium metal or an accelerator Nouryact VN-2 from the company AkzoNobel (vanadium monobutyldihydrophosphite in monobutyl dihydrophosphite). All the resins are in styrene or chlorostyrene. However, vanadium carboxylates or vanadium monobutyldihydrophosphite do not make it possible to obtain rapid polymerization of (meth)acrylic syrups based on monofunctional monomers. This is probably due to the reactivity of aromatic vinyl monomers and of unsaturated polyester oligomers, which is very much higher than that of monofunctional (meth)acrylic monomers alone.

WO 2014/013 028 describes a (meth)acrylic syrup comprising a (meth)acrylic polymer, a (meth)acrylic monomer and an initiator to start the polymerization of the (meth)acrylic monomer, said initiator being in the form of a liquid peroxide compound. It also optionally comprises a tertiary amine. Said document does not describe and further does not suggest the use of a vanadium salt in combination with the tertiary amine to accelerate the polymerization kinetics.

WO 2014/174 098 describes a (meth)acrylic syrup comprising a (meth)acrylic polymer, a (meth)acrylic monomer and an initiator to start the polymerization of the (meth)acrylic monomer, said initiator being in the form of a peroxide compound that is liquid in a temperature range of between 0° and 50° C. It also comprises at least one organic aldehyde, an organic peracid and an accelerator based on a transition metal salt. It cites metals such as Mn, Co, Fe or Cu, but does not, however, state that the transition metal may be vanadium. Said document does not describe, either, the use of a tertiary amine in combination with a vanadium salt to accelerate the polymerization kinetics.

U.S. Pat. No. 3,476,723 describes a syrup of alkyl methacrylate monomer and of methyl methacrylate polymer, a benzoyl peroxide as initiator, an accelerator based on vanadium and an aliphatic aldehyde comprising 1-18 carbon atoms in the molecule. Said document presents the accelerating system based on vanadium and aldehyde as being advantageous relative to the use of a tertiary amine used in the prior art, since, once polymerized, the polymers obtained do not bleach under the effect of solar rays. Said document does not describe, and further does not suggest, the use of a tertiary amine in combination with a vanadium salt to accelerate the polymerization kinetics.

Finally, U.S. Pat. No. 3,238,274 describes a thermosetting resin system based on unsaturated polyester, a vanadium oxide and/or carboxylate, a monoalkyl or dialkyl phosphate and a hydroperoxide. The vanadium content may be very low (less than 0.02% of metal). However, with thermoplastic syrups based on monofunctional (meth)acrylic monomer, these vanadium salts do not make it possible to obtain rapid polymerization, comparable to the gelling times described in said document, since the intrinsic reactivity of the resins of unsaturated polyester and of styrene is much higher than the reactivity of monofunctional (meth)acrylic monomers based on the syrup according to the invention.

The prior art does not describe a stable liquid (meth)acrylic syrup, capable of being polymerized at room temperature by means of a liquid initiator, which can be readily used in all the existing injection machines without obstructing their feed lines.

The prior art does not describe, either, a (meth)acrylic syrup which makes it possible to obtain, after impregnation of a fibrous substrate with said syrup followed by polymerization of said syrup, composite parts whose mechanical properties are not degraded.

The prior art does not describe, either, a solution that is compatible with an industrial process for the impregnation of a fibrous substrate, according to which the polymerization of the impregnating (meth)acrylic syrup takes place "without heating" in less than 30 minutes, and preferentially in less than 20 minutes.

Technical Problem

The aim of the invention is thus to overcome the drawbacks of the prior art by proposing a viscous liquid (meth)acrylic syrup which is stable and easy to use, which can be used on any existing infusion or RTM process injection machine without obstructing its feed lines, and the polymerization of which is compatible with industrial processes for the impregnation of fibrous substrate and for the manufacture of composite parts.

According to another object of the present invention, the viscous liquid (meth)acrylic syrup is intended for impregnation or injection molding and may be readily prepared in a one-component or two-component system and mixed homogeneously before the injection or impregnation.

Another object of the present invention is to propose a process for impregnating a fibrous substrate with such a viscous liquid (meth)acrylic syrup so as to completely, correctly and homogeneously wet the fibrous substrate during the impregnation, so as not to degrade the mechanical performance qualities of the composite part obtained after polymerization.

Yet another object of the present invention is to manufacture a three-dimensional composite part or a mechanical or structured part comprising a thermoplastic composite material which has satisfactory mechanical properties such as high stiffness and a Young's modulus of at least 15 GPa.

BRIEF DESCRIPTION OF THE INVENTION

The Applicant has discovered, surprisingly, that a viscous liquid (meth)acrylic syrup comprising:
 a) a (meth)acrylic polymer,
 b) a (meth)acrylic monomer,
 c) an initiator to start the polymerization of the (meth)acrylic monomer, said initiator being in the form of a peroxide compound that is liquid in a temperature range of between 0° and 50° C.,
 said syrup being characterized in that the initiator is combined with an accelerating system comprising:
 d) a vanadium salt and
 e) a tertiary amine,
is homogeneous and able to be used on existing injection machines without obstruction of the feed lines thereof, has a polymerization time that is compatible with industrial processes for the impregnation of fibrous substrates and for the manufacture of composite parts, and allows complete and correct impregnation of a fibrous substrate.

The Applicant has also discovered, surprisingly, that the use of this (meth)acrylic syrup for impregnating a fibrous substrate, said fibrous substrate consisting of long fibers, makes it possible to obtain complete and correct impregnation of the fibrous substrate.

Similarly, the Applicant has discovered that an impregnation process for impregnating a fibrous substrate, said fibrous substrate consisting of long fibers and said process being characterized in that it comprises a step of impregnating said fibrous substrate with a (meth)acrylic liquid syrup comprising:
 a) a (meth)acrylic polymer,
 b) a (meth)acrylic monomer,
 c) an initiator to start the polymerization of the (meth)acrylic monomer, said initiator being in the form of a peroxide compound that is liquid in a temperature range of between 0° and 50° C.,
 the initiator being combined with an accelerating system comprising:
 d) a vanadium salt and
 e) a tertiary amine,
allows complete and correct impregnation of the fibrous substrate.

Surprisingly, it has also been discovered that a process for polymerizing such a viscous liquid (meth)acrylic syrup, said syrup being a two-component system comprising a first component resulting from the mixing of compounds a), b), d) and e) and a second component comprising the initiating compound c), said process consisting in mixing the first and second components of the two-component system less than 10 minutes before injection in a mold or impregnation of a fibrous substrate, makes it possible to obtain rapid polymerization "without heating" that is compatible with industrial processes for manufacturing mechanical parts and makes it possible to obtain mechanical or structured parts that have satisfactory mechanical properties.

It has also been discovered, surprisingly, that a process for manufacturing composite parts, comprising the following steps:
 a) impregnating a fibrous substrate with such a viscous liquid (meth)acrylic syrup, b) polymerizing the viscous liquid (meth)acrylic syrup impregnating said fibrous substrate, makes it possible to obtain mechanical parts or structured elements that have satisfactory mechanical properties.

DETAILED DESCRIPTION OF THE INVENTION

The term "fibrous substrate" as used refers to fabrics, felts or nonwovens that may be in the form of strips, laps, braids, locks or pieces.

The term "vinyl monomer" as used refers to monomers of any type which comprise an $H_2C=CHR$ structure.

The term "(meth)acrylic" as used refers to any type of acrylic or methacrylic monomer.

The term "PMMA" as used refers to homo- and copolymers of methyl methacrylate (MMA), the weight ratio of MMA in the PMMA being at least 70% by weight for the MMA copolymer.

The term "monomer" as used relates to a molecule which can undergo polymerization.

The term "monofunctional monomer" as used refers to a molecule which can undergo a polymerization and which comprises only one function that is capable of undergoing the polymerization, preferably only one C=C type double bond.

The term "polymerization" as used refers to the process of converting a monomer or a mixture of monomers into a polymer.

The term "thermoplastic polymer" as used refers to a polymer that becomes liquid or becomes more liquid or less viscous when heated and that can take on new shapes by the application of heat and pressure.

The term "thermosetting polymer" as used refers to a prepolymer in a soft, solid or viscous state that changes irreversibly into an unmeltable, insoluble polymer network by curing.

The term "polymer composite" as used refers to a multicomponent material comprising several different phase domains, in which at least one type of phase domain is a continuous phase and in which at least one component is a polymer.

The term "initiator" as used refers to a chemical species that reacts with a monomer to form an intermediate compound capable of bonding successfully with a large number of other monomers as a polymer compound.

The term "liquid peroxide" as used relates to an organic peroxide that is intrinsically liquid or used as solute in a solvent and whose dynamic viscosity is between 1 and 1000 mPa.s, preferably between 1 and 100 mPa.s, at 25° C.

The term "accelerator" as used relates to an organo-soluble compound added to a liquid composition to accelerate the kinetics of a room-temperature polymerization reaction.

The term "accelerating system" as used relates to a system comprising several organo-soluble compounds which, in combination, are capable of accelerating the kinetics of a room-temperature polymerization reaction.

According to a first aspect, the present invention relates to a viscous liquid (meth)acrylic syrup comprising:
a) a (meth)acrylic polymer,
b) a (meth)acrylic monomer,
c) an initiator to start the polymerization of the (meth)acrylic monomer, said initiator being in the form of a peroxide compound that is liquid in a temperature range of between 0° and 50° C., said syrup being characterized in that the initiator is combined with an accelerating system comprising:
d) a vanadium salt and
e) a tertiary amine.

As regards the (meth)acrylic polymer, it may be chosen from polyalkyl methacrylates or polyalkyl acrylates. According to a preferred embodiment, the (meth)acrylic polymer is polymethyl methacrylate (PMMA). It should consequently be understood that polymethyl methacrylate (PMMA) may denote a methyl methacrylate (MMA) homopolymer or an MMA copolymer or mixtures thereof.

In particular, it may be a mixture of at least two MMA homopolymers having a different molecular weight, or a mixture of at least two MMA copolymers having an identical monomer composition and a different molecular weight, or a mixture of at least two MMA copolymers having a different monomer composition. It may also be a mixture of at least one MMA homopolymer and of at least one MMA copolymer.

According to one embodiment, the methyl methacrylate (MMA) homopolymer or copolymer comprises at least 70%, preferably at least 80%, advantageously at least 90% and more advantageously at least 95% by weight of methyl methacrylate. The methyl methacrylate (MMA) copolymer may also comprise from 0.3% to 30% by weight of at least one monomer containing at least one ethylenic unsaturation that can copolymerize with methyl methacrylate. Among these monomers, mention may be made especially of: acrylic and methacrylic acids and alkyl (meth)acrylates in which the alkyl group contains from 1 to 12 carbon atoms. As examples, mention may be made of methyl acrylate and ethyl, butyl or 2-ethylhexyl (meth)acrylate. Preferably, the comonomer is an alkyl acrylate in which the alkyl group contains from 1 to 4 carbon atoms.

According to a preferred embodiment, the methyl methacrylate (MMA) copolymer comprises from 70% to 99.7%, preferably from 80% to 99.7%, advantageously from 90% to 99.7% and more advantageously from 90% to 99.5% by weight of methyl methacrylate and from 0.3% to 30%, preferably from 0.3% to 20%, advantageously from 0.3% to 10% and more advantageously from 0.5% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight-average molecular weight of the (meth) acrylic polymer is generally high, and may consequently be greater than 50 000 g/mol, preferably greater than 100 000 g/mol. The weight-average molecular weight may be measured by size exclusion chromatography (SEC).

As regards the (meth)acrylic monomer(s), included in the (meth)acrylic syrup in addition to the (meth)acrylic polymer, they are chosen from a (meth)acrylic monomer or a vinyl monomer, or a mixture thereof.

On the other hand, the syrup does not comprise more than 5 parts by weight of aromatic vinyl monomer. Such an aromatic vinyl monomer may be chosen, for example, from α-methylstyrene, ortho-, β- or para-methylstyrene, tert-butylstyrene and nitrostyrene, and mixtures thereof. Preferably, such an aromatic vinyl monomer is not styrene, and, even more preferably, the syrup does not comprise any aromatic vinyl monomer.

In addition, the syrup does not comprise more than 5 parts by weight, preferably not more than 3 parts by weight, more preferably not more than 1 part by weight of multifunctional (meth)acrylic monomers, i.e. comprising several (meth)

acrylate functions per monomer. Even more preferably, the syrup does not comprise such multifunctional (meth)acrylic monomers.

Among the (meth)acrylic monomers, the syrup may also comprise oligomers with (meth)acrylate functionality, such as epoxy-(meth)acrylates or urethane (meth)acrylates or polyester (meth)acrylates. Preferably, these oligomers are present in the syrup in a proportion of not more than 5 parts by weight, preferably not more than 3 parts by weight, more preferably not more than 1 part by weight and even more preferably the syrup does not contain any thereof.

Preferably, the syrup predominantly comprises monomer(s) or monofunctional (meth)acrylic monomer(s). The term "predominantly" means that at least 95% of the monomers in the syrup are monofunctional, preferably at least 97%, more preferably at least 98%, even more preferably at least 99%, advantageously at least 99.5%, more advantageously 99.9% and even more advantageously all of the monomers are monofunctional.

Preferably, the (meth)acrylic monomer(s) are chosen from acrylic acid, methacrylic acid, alkyl acrylic monomers, alkyl methacrylic monomers, the alkyl group possibly being linear, branched or cyclic and containing from 1 to 22 carbon atoms, preferably from 1 to 12 carbon atoms.

Preferably, the monomer(s) constituting the (meth)acrylic syrup are chosen from methyl methacrylate, ethyl methacrylate, methyl acrylate, ethyl acrylate, methacrylic acid, acrylic acid, n-butyl acrylate, isobutyl acrylate, cyclohexyl acrylate, cyclohexyl methacrylate, isobornyl acrylate, isobornyl methacrylate, heptyl methacrylate, n-octyl acrylate, 2-octyl acrylate, isooctyl acrylate, 2-ethylhexyl methacrylate, butyldiglycol methacrylate, dicyclopentenyloxyethyl methacrylate, ethoxyethyl methacrylate, isobutyl methacrylate, n-butyl methacrylate, tert-butyl methacrylate, hydroxypropyl methacrylate and N-vinylpyrrolidone, and mixtures thereof.

More advantageously, the (meth)acrylic monomer is chosen from methyl methacrylate, isobornyl acrylate and acrylic acid, and mixtures thereof.

According to a preferred embodiment, at least 50% by weight, preferably at least 60% by weight, of the (meth)acrylic monomer(s) is methyl methacrylate.

According to a more preferred embodiment, at least 50% by weight, preferably at least 60% by weight, more preferably at least 70% by weight, advantageously at least 80% by weight and even more advantageously 90% by weight of the (meth)acrylic monomer is a mixture of methyl methacrylate with isobornyl acrylate and/or acrylic acid.

As regards the initiator for starting the polymerization of the (meth)acrylic monomer, it is advantageously a radical initiator.

Advantageously, the radical initiator is a peroxide that is liquid within a temperature range of between 0° C. and 50° C.

The liquid peroxide is an organic peroxide comprising 2 to 30 carbon atoms, chosen from hydroperoxides, ketone peroxides and peroxyesters.

Preferably, the liquid peroxide is a hydroperoxide chosen from tert-butyl hydroperoxide, monohydroperoxide, paramethane hydroperoxide, tert-amyl hydroperoxide and cumene hydroperoxide. Even more preferably, it is monohydroperoxide or para-methane hydroperoxide or cumene hydroperoxide.

On decomposing, such an initiator generates free radicals which contribute toward starting the polymerization reaction.

The amount of initiator is advantageously between 0.1 part by weight and 5 parts by weight, preferably between 0.1 and 3 parts by weight, even more preferably between 0.2 and 1 part by weight relative to the sum of the (meth)acrylic monomer and of the (meth)acrylic polymer, these latter two together representing 100 parts by weight. The amounts are given relative to the (meth)acrylic liquid syrup injected or used for the impregnation.

As regards the accelerating system, it advantageously comprises a combination of a vanadium salt with a tertiary amine. Thus, any use of cobalt, which is a metal classified as being toxic, is set aside.

The accelerating system is soluble in the syrup based on (meth)acrylic monomers, and makes it possible to entrain decomposition of the initiator so as to generate the free radicals required to start the polymerization. The vanadium salt is a salt comprising phosphorus ligands, such as dialkyl phosphates or trialkyl phosphates, preferentially dialkyl phosphates with alkyl chains comprising between 2 and 20 carbon atoms.

Advantageously, the content of vanadium (which comes from vanadium salt) in the syrup is less than 1 part by weight, more advantageously it is less than 0.5 part by weight preferably it is less than or equal to 0.2 part by weight and even more preferably it is between 0.0005 and 0.1 part by weight. Although the proportions of vanadium salt in the syrup are very low, the accelerating system is very reactive, by virtue of the combined action of the tertiary amine.

To facilitate the use, the vanadium salt is diluted in solvents or plasticizers to have a viscosity that is suitable for use.

The use of a carefully chosen tertiary amine, in suitable proportions, allows the (meth)acrylic syrup to be polymerized in a short time, typically less than 30 minutes and preferably less than 20 minutes, which is compatible with the production of composite parts, using standard injection machines. It has especially been discovered that the same amine can both accelerate or slow down the polymerization reaction, depending on its content in the (meth)acrylic syrup.

Advantageously, in order to be able to obtain rapid polymerization kinetics, i.e. a polymerization time of less than 30 minutes and preferably less than 20 minutes, the content of tertiary amine in the (meth)acrylic syrup must be advantageously between 0.05 part by weight and 1 part by weight, preferentially between 0.1 and 0.8 part by weight and more preferentially between 0.2 and 0.6 part by weight. Such proportions of tertiary amine make it possible to achieve satisfactory kinetics.

The tertiary amine is advantageously chosen from N,N-dimethyl-p-toluidine (DMPT), N,N-dihydroxyethyl-p-toluidine (DHEPT), N,N-diethyl-p-toluidine (DEPT) and para-toluidine ethoxylate (PTE).

All the components of the syrup (initiator and accelerating system) taken separately are stable for several months. They are liquid and dissolve readily in the (meth)acrylic monomer so as to form a homogeneous (meth)acrylic syrup.

By using both a liquid initiator and a liquid accelerating system, they dissolve readily in the (meth)acrylic monomer so as to form a homogeneous (meth)acrylic syrup. The initiator is easy to use, stable and industrializable.

Since the initiator is liquid, it does not obstruct the feed lines of the injection machine used for performing the process for impregnating the fibrous substrate and/or the process for manufacturing mechanical parts or structured elements or articles made of composite material according to the invention, even before being mixed with the mixture of (meth)acrylic monomer(s), of (meth)acrylic polymer(s) and of the accelerating system.

Similarly, since the initiator is soluble in the syrup, after mixing the initiator with the mixture of (meth)acrylic monomer(s), of (meth)acrylic polymer(s) and of the accelerating system, the (meth)acrylic liquid syrup does not obstruct the feed lines of the injection machine used for performing the process for impregnating the fibrous substrate and/or the process for manufacturing mechanical parts or structured elements or articles made of composite material according to the invention.

As regards the (meth)acrylic liquid syrup according to the invention, intended to be used for impregnating a fibrous substrate, for example, said fibrous substrate consisting of long fibers, it comprises a monomer or a mixture of meth (acrylic) monomers, at least one (meth)acrylic polymer dissolved in the monomer, an initiator and the accelerating system. This solution is commonly referred to as "syrup" or "prepolymer".

Advantageously, the liquid monomer syrup contains no additional deliberately added solvent.

The (meth)acrylic polymer is completely soluble in the (meth)acrylic monomer.

The (meth)acrylic polymer is PMMA, i.e. methyl methacrylate (MMA) homopolymer or copolymer or a mixture thereof as defined previously.

The (meth)acrylic monomer(s) are the same as those defined previously.

The (meth)acrylic monomer(s) in the liquid (meth)acrylic syrup are present in a proportion of at least 40% by weight, preferably at least 50% by weight, advantageously at least 60% by weight and more advantageously at least 65% by weight of the total liquid (meth)acrylic syrup.

The (meth)acrylic monomer(s) in the liquid (meth)acrylic syrup are present in a proportion of not more than 90% by weight, preferably not more than 85% by weight and more advantageously not more than 80% by weight of the total liquid (meth)acrylic syrup.

The (meth)acrylic polymer(s) in the (meth)acrylic liquid syrup represent at least 10% by weight, preferably at least 15% and more advantageously at least 20% by weight of the total weight of the (meth)acrylic liquid syrup.

The (meth)acrylic polymer(s) in the (meth)acrylic liquid syrup represent not more than 60% by weight, preferably not more than 50%, advantageously not more than 40% and more advantageously not more than 35% by weight of the total weight of the (meth)acrylic liquid syrup.

Preferably, the viscous liquid (meth)acrylic syrup comprises:
a) 10 to 60 parts by weight of (meth)acrylic polymer,
b) 40 to 90 parts by weight of (meth)acrylic monomer,
c) 0.1 to 3 parts by weight, preferably from 0.1 to 1 part by weight of initiator,
d) less than 1 part by weight, preferably less than 0.5 part by weight, more preferably less than 0.2 part by weight and even more preferably between 0.0005 and 0.1 part by weight of vanadium, originating from the vanadium salt and
e) 0.05 to 1 part by weight, preferably from 0.1 to 0.8 part by weight and even more preferably from 0.2 to 0.6 part by weight of tertiary amine, relative to the sum of the (meth)acrylic monomer and of the (meth)acrylic polymer, the two together representing 100 parts by weight.

The dynamic viscosity of the liquid (meth)acrylic syrup is in a range from 10 mPa.s to 10 000 mPa.s, preferably from 10 mPa.s to 5000 mPa.s, more preferably from 50 mPa.s to 5000 mPa.s, advantageously from 100 mPa.s to 1000 mPa.s and more advantageously from 100 mPa.s to 500 mPa.s. The viscosity of the syrup can be readily measured with a rheometer or a viscometer. The dynamic viscosity is measured at 25° C. The liquid (meth)acrylic syrup has Newtonian behavior, which means that it shows no shear thinning, so that the dynamic viscosity is independent of the shear in a rheometer or of the speed of the spindle in a viscometer.

If the viscosity of the liquid (meth)acrylic syrup at a given temperature is too high for the impregnation process and for correct impregnation, it is possible to heat the syrup so as to obtain a syrup that is more liquid within the limits of the dynamic viscosity range mentioned previously at the respective temperature at which the impregnation takes place for sufficient wetting and correct and complete impregnation of the fibrous substrate.

The (meth)acrylic liquid syrup according to the invention may thus be used on all the existing injection machines for a resin transfer molding (RTM) or infusion process.

The liquid initiator allows polymerization of the (meth)acrylic monomer with short cycle times.

Since the amounts of initiator and of the accelerating system are relatively low (less than 5 parts by weight), the mechanical properties of the composite material are not thereby degraded.

Since the syrup uses very little or no aromatic vinyl monomers, it does not degrade the resistance to ultraviolet radiation of the composite material obtained.

The reactivity of the (meth)acrylic liquid syrup according to the invention is less sensitive to the temperature variations in workshops than the syrups of the prior art, which makes it possible to conserve comparable cycle times throughout the year.

The liquid (meth)acrylic syrup may also comprise other additives and fillers. For the purposes of the present invention, a filler is not considered as an additive. All the additives and fillers may be added to the liquid (meth)acrylic syrup before the impregnation.

Additives that may be mentioned include organic additives such as impact modifiers or block copolymers, heat stabilizers, UV stabilizers, lubricants, dispersants, antifoams, rheology modifiers, waxes, adhesion modifiers and mold release agents, and mixtures thereof.

The impact modifier is in the form of fine particles comprising an elastomeric core and at least one thermoplastic shell, the size of the particles being in general less than 1 m and advantageously between 50 and 300 nm. The impact modifier is prepared by emulsion polymerization. The impact strength modifier content of the liquid monomer syrup is from 0 to 50% by weight, preferably from 0 to 25% by weight and advantageously from 0 to 20% by weight.

Fillers that may be mentioned include carbon nanotubes or mineral fillers including mineral nanofillers ($TiO_2$, silica) and carbonates and hydrates. The filler content in the liquid monomer syrup is from 0% by weight to 60% by weight.

As regards the fibrous substrate, mention may be made of fabrics, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibers. When the fibers are continuous, their assembly forms fabrics.

The one-dimensional form corresponds to linear fibers. The fibers may be discontinuous or continuous. The fibers may be arranged randomly or in the form of a continuous filament parallel to each other. A fiber is defined by its aspect ratio, which is the ratio between the length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two-dimensional form corresponds to nonwoven fibrous mats or reinforcements or woven reinforcements or woven locks or bundles of fibers, which may also be braided. Even if these two-dimensional forms have a certain thickness and therefore in principle a third dimension, they are considered as two-dimensional according to the present invention.

The three-dimensional form corresponds, for example, to nonwoven fibrous mats or reinforcements or stacked or folded bundles of fibers or mixtures thereof, an assembly of the two-dimensional form in the third dimension.

The fibrous material may be of natural or synthetic origin. Natural materials that may be mentioned include plant fibers, wood fibers, animal fibers or mineral fibers.

Natural fibers are, for example, sisal, jute, hemp, flax, cotton, coconut fibers, and banana fibers. Animal fibers are for example wool or hair.

Synthetic materials that may be mentioned include polymeric fibers chosen from fibers of thermosetting polymers, of thermoplastic polymers or mixtures thereof.

The polymeric fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibers may also be chosen from glass fibers, especially of E, R or S2 type, carbon fibers, boron fibers or silica fibers.

The fibrous substrate of the present invention is chosen from plant fibers, wood fibers, animal fibers, mineral fibers, synthetic polymeric fibers, glass fibers and carbon fibers, and mixtures thereof. Preferably, the fibrous substrate is chosen from mineral fibers.

The fibers of the fibrous material have a diameter between 0.005 µm and 100 µm, preferably between 1 µm and 50 µm, more preferably between 5 µm and 30 µm and advantageously between 10 µm and 25 µm.

Preferably, the fibers of the fibrous material of the present invention are chosen from continuous fibers (meaning that the aspect ratio does not apply as for long fibers) for the one-dimensional form, or long or continuous fibers forming the two- or three-dimensional form of the fibrous substrate.

An additional aspect according to the present invention is the impregnation process, for impregnating a fibrous substrate, said fibrous substrate being made of long fibers and said process being characterized in that it comprises a step of impregnating said fibrous substrate with a liquid (meth)acrylic syrup comprising:
  a) a (meth)acrylic polymer,
  b) a (meth)acrylic monomer,
  c) an initiator to start the polymerization of the (meth)acrylic monomer, said initiator being in the form of a peroxide compound that is liquid in a temperature range of between 0° and 50° C.,
the initiator being combined with an accelerating system comprising:
  d) a vanadium salt and
  e) a tertiary amine.

Another additional aspect according to the present invention is a process for polymerizing the (meth)acrylic viscous liquid syrup according to the invention, said syrup being a two-component system comprising a first component resulting from the mixing of compounds a), b), d) and e) and a second component comprising the initiating compound c), said process consisting in mixing the first and second component of the two-component system less than 10 minutes before injection into a mold or impregnation of a fibrous substrate.

Another aspect of the present invention is a process for manufacturing structured mechanical parts or articles, characterized in that it comprises the following steps:
  a) impregnating a fibrous substrate with the viscous liquid (meth)acrylic syrup according to the invention,
  b) polymerizing said liquid (meth)acrylic syrup impregnating said fibrous substrate.

Most advantageously, the process for manufacturing mechanical or structured parts or articles comprising the polymeric composite material is chosen from resin transfer molding or infusion.

All these processes comprise the step of impregnating the fibrous substrate with the (meth)acrylic liquid syrup according to the invention, before the polymerization step in a mold.

Preferably, the impregnation of the fibrous substrate in step a) is performed in a closed mold.

Advantageously, step a) and step b) are performed in the same closed mold.

Advantageously, the polymerization temperature in step b) is less than 120° C., preferably less than 80° C. and more preferably less than 40° C. The polymerization temperature is the temperature at the beginning of the polymerization, at the peak the temperature may be higher.

Using the same mold avoids transfer of the material after impregnation.

The manufactured mechanical or structural parts or articles do not contain any additional solvent deliberately added, since the syrup did not contain any additional solvent for the impregnation step.

As regards the structured mechanical parts or articles manufactured according to the present invention, they comprise at least 20% by weight of fibrous substrate, preferably at least 40% by weight of fibrous material, advantageously at least 50% by weight of fibrous material and advantageously at least 55% by weight of fibrous material relative to the total composition.

The structured mechanical parts or articles manufactured according to the present invention comprise not more than 99% by weight of fibrous material, preferably not more than 95% by weight of fibrous material, advantageously not more than 90% by weight of fibrous material and advantageously not more than 80% by weight of fibrous material relative to the total composition.

The process for manufacturing mechanical or structured parts or articles according to the invention allows complete, correct and homogeneous wetting of the fibrous substrate during the impregnation. There are no defects of fiber wetting during impregnation for example due to bubbles and voids that decrease the mechanical performance of the manufactured mechanical or structural parts or articles.

The mechanical or structured parts or articles manufactured according to the invention are essentially free of pores. The term "pore" means a spherical void with a diameter of at least 1 µm or larger or an elongated ellipsoidal void in form of an oblate with a smallest principal axis of at least 0.5 m or more. The term "essentially free of pores" means that the pores represent less than 1% by volume, preferably less than 0.5% by volume and more preferably less than 0.2% by volume relative to the total volume of the manufactured mechanical or structural parts or articles.

Resin transfer molding is a process using a two-sided mold assembly which forms the two surfaces of a composite material. The lower side is a rigid mold. The upper side may be a rigid or flexible mold. Flexible molds can be made from composite materials, silicone or extruded polymer films such as nylon. The two sides fit together to produce a mold cavity. The distinguishing feature of resin transfer molding is that the fibrous substrate is placed into this cavity and the mold assembly is closed prior to the introduction of the (meth)acrylic liquid syrup. Resin transfer molding includes numerous variants which differ in the mechanics of how the liquid (meth)acrylic syrup is introduced into the fibrous substrate in the mold cavity. These variations range from vacuum infusion to vacuum-assisted resin transfer molding (VARTM). This process may be performed at room temperature or at elevated temperature. The term "room temperature" means between 10° C. and 50° C. The term "elevated temperature" means up to 200° C. Preferably, an elevated temperature is between 50° C. and 160° C.

In the case of the infusion process, the (meth)acrylic liquid syrup must have the appropriate viscosity for this process for preparing the polymeric composite material. The (meth)acrylic liquid syrup is sucked into the fibrous substrate, which is in a special mold, by applying a gentle vacuum. The fibrous substrate is infused and completely impregnated with the (meth)acrylic liquid syrup.

One advantage of this method is the large amount of fibrous material in the composite.

As regards the use of the three-dimensional parts or mechanical or structured articles manufactured according to the invention, mention may be made of automotive applications, nautical applications, railroad applications, sport, aeronautical and aerospace applications, photovoltaic applications, computer-related applications, telecommunication applications and wind turbine applications.

In particular, the three-dimensional mechanical or structural part is a motor vehicle part, boat part, train part, sport article, plane or helicopter part, space ship or rocket part, photovoltaic module part, wind turbine part, furniture part, construction or building part, telephone or cellphone part, computer or television part, printer or photocopier part.

COMPARATIVE EXAMPLE

Example 1 (Comparative)

a syrup is prepared by dissolving 25 parts by weight of PMMA in 75 parts by weight of MMA which is stabilized in HQME (hydroquinone monomethyl ether). To the 100 parts by weight of syrup are added 0.8 part by weight of benzoyl peroxide (BPO—Luperox A75 from Arkema) and 0.3 part by weight of DEPT (N,N-diethyl-para-toluidine). The syrup has a dynamic viscosity of 520 mPa.s at 25° C. The BPO powder is not fully dissolved in the syrup. Once the stirring is stopped, the solid particles are still visible and they sediment in the bottom of the container.

The syrup is polymerized in a container with a volume of 100 ml at a room temperature of 25° C.±1° C. The temperature is measured using a temperature detector placed in the syrup. After 40 minutes, the temperature reaches the peak.

Example 2 (Comparative)

the same base syrup based on MMA and PMMA is prepared as in example 1. To 100 parts by weight of MMA+PMMA syrup are added 1 part by weight of methyl ethyl ketone peroxide (MEKP—Luperox K12 from Arkema), which is a liquid product, and 0.018 part by weight of cobalt octoate (from Sigma-Aldrich). The syrup is transparent.

The syrup is polymerized in a container with a volume of 100 ml at a room temperature of 25° C.±1° C. The temperature is measured using a temperature detector placed in the syrup. The temperature reaches the peak after more than 24 hours.

Example 3 (According to the Invention)

a syrup is prepared by dissolving 23 parts by weight of PMMA in 77 parts by weight of MMA which is stabilized in HQME (hydroquinone monomethyl ether). To the 100 parts by weight of MMA+PMMA syrup are added 1 part by weight of cumene hydroperoxide (CHP—Luperox CU80 from Arkema), which is a liquid product, 0.9 part by weight of PTE (N,N-diethyl-p-toluidine—Bisomer PTE from the company GEO Specialty Chemicals) and 0.6 part by weight of vanadium dibutyl phosphate in propylene glycol (VP0132 from OMG Borcher) which contains 5% by mass of vanadium. The syrup is transparent.

The syrup is polymerized in a container with a volume of 100 ml at a room temperature of 25° C.±1° C. The temperature is measured using a temperature detector placed in the syrup. The temperature reaches the peak after only 10 minutes.

Example 4 (According to the Invention)

the same base syrup based on MMA and PMMA is prepared as in example 3. To 100 parts by weight of MMA+PMMA syrup are added 1 part by weight of cumene hydroperoxide (CHP—Luperox CU80 from Arkema), which is a liquid product, 0.3 part by weight of PTE (N,N-diethyl-p-toluidine—Bisomer PTE from the company GEO Specialty Chemicals) and 0.2 part by weight of vanadium dibutyl phosphate in propylene glycol (VP0132 from OMG Borcher) which contains 5% by mass of vanadium. The syrup is transparent.

The syrup is polymerized in a container with a volume of 100 ml at a room temperature of 25° C. 1° C. The temperature is measured using a temperature detector placed in the syrup. The temperature reaches the peak after 15 minutes and the polymerized matrix is transparent.

Example 5 (According to the Invention)

several base syrups based on MMA and PMMA are prepared as in example 3. To 100 parts by weight of MMA+PMMA syrup are added 1 part by weight of a liquid hydroperoxide, PTE (N,N-diethyl-p-toluidine—Bisomer PTE from the company GEO Specialty Chemicals) in proportions which vary from one syrup to another, and 0.2 part by weight of vanadium dibutyl phosphate in propylene glycol (VP0132 from OMG Borcher) which contains 5% by mass of vanadium.

Thus, a first syrup does not comprise any amine, a second syrup comprises 0.1 part by weight of PTE, a third syrup comprises 0.2 part by weight of PTE, a fourth syrup comprises 0.3 part by weight of PTE, a fifth syrup comprises 0.4 part by weight of PTE, a sixth syrup comprises 0.5 part by weight of PTE, a seventh syrup comprises 0.65 part by weight of PTE and an eighth syrup comprises 0.8 part by weight of PTE.

Each syrup is polymerized in a container with a volume of 100 ml at a room temperature of 25° C.±1° C. The temperature is measured using a temperature detector placed in the syrup.

The time to reach the temperature peak characteristic of polymerization of the (meth)acrylic monomer was recorded for each syrup and is given in table I below.

TABLE I

| Syrup No. | Amount of PTE (in parts by weight) | Peak time |
| --- | --- | --- |
| 1 | 0 | No peak |
| 2 | 0.1 | 24 minutes |
| 3 | 0.2 | 17 minutes |
| 4 | 0.3 | 15 minutes |
| 5 | 0.4 | 14 minutes |
| 6 | 0.5 | 14 minutes |
| 7 | 0.65 | 14 minutes |
| 8 | 0.8 | 13 minutes |

The results obtained demonstrate that the polymerization kinetics are very satisfactory for proportions of tertiary amine in the syrup of between 0.05 and 1 part by weight, preferably between 0.1 and 0.8 part by weight and even more preferably between 0.2 and 0.6 part by weight.

Example 6 (According to the Invention)

several base syrups based on MMA and PMMA are prepared as in example 3. To 100 parts by weight of MMA+PMMA syrup are added 1 part by weight of a liquid hydroperoxide, 0.3 part by weight of PTE (N,N-diethyl-p-toluidine—Bisomer PTE from the company GEO Specialty Chemicals) and vanadium dibutyl phosphate in propylene glycol (VP0132 from OMG Borcher) which contains 5% by mass of vanadium, in proportions which vary from one syrup to another.

Thus, a first syrup comprises 0.1 part by weight of VP0132, a second syrup comprises 0.2 part by weight of VP0132, a third syrup comprises 0.3 part by weight of VP0132, a fourth syrup comprises 0.4 part by weight of VP0132, a fifth syrup comprises 0.5 part by weight of VP0132, a sixth syrup comprises 0.8 part by weight of VP0132 and a seventh syrup comprises 1 part by weight of VP0132.

Each syrup is polymerized in a container with a volume of 100 ml at a room temperature of 25° C.±1° C. The temperature is measured using a temperature detector placed in the syrup.

The time to reach the temperature peak characteristic of polymerization of the (meth)acrylic monomer was recorded for each syrup and is given in table II below.

TABLE II

| Syrup No. | Amount of VP0123 (in parts by weight) | Content of Va (in parts by weight) | Peak time |
| --- | --- | --- | --- |
| 1 | 0.1 | 0.005 | 21 minutes |
| 2 | 0.2 | 0.01 | 18 minutes |
| 3 | 0.3 | 0.015 | 13 minutes |
| 4 | 0.4 | 0.02 | 12 minutes |
| 5 | 0.5 | 0.025 | 15 minutes |
| 6 | 0.8 | 0.04 | 14 minutes |
| 7 | 1 | 0.05 | 14 minutes |

The results obtained demonstrate that the polymerization kinetics are very satisfactory for proportions of vanadium salt, containing 5% by mass of vanadium, of between 0.1 and 1 part by weight and corresponding to vanadium contents of between 0.005 and 0.05 part by weight.

The (meth)acrylic syrup according to the invention has the advantage of being stable over time, of polymerizing rapidly, and as such it is compatible with industrial processes for impregnation and for manufacture of three-dimensional composite parts, while at the same time comprising small amounts of accelerator, and without using multifunctional monomers, or aromatic vinyl monomers, or cobalt salts as accelerators.

The invention claimed is:

1. A viscous liquid (meth)acrylic syrup, whose dynamic viscosity is within a range from 10 mPa.s to 10,000 mPa.s at 25° C., comprising:
   a) 10 to 60 parts by weight of a (meth)acrylic polymer having a molecular weight of greater than 100,000 g/mol,
   b) 40 to 90 parts by weight of a (meth)acrylic monomer,
   c) 0.1 to 3 parts by weight of an initiator to start the polymerization of the (meth)acrylic monomer, said initiator being in the form of a peroxide compound that is liquid in a temperature range of between 0° and 50° C.,
   said syrup being characterized in that the initiator is combined with an accelerating system comprising:
   d) 0.0005 to 0.1 part by weight of vanadium salt and
   e) 0.05 to 1 part by weight of a tertiary amine,
   the parts by weight relative to the sum of the (meth)acrylic monomer and of the (meth)acrylic polymer, the two together representing 100 parts by weight.

2. The (meth)acrylic syrup as claimed in claim 1, wherein the vanadium salt d) is a salt comprising phosphorus ligands.

3. The (meth)acrylic syrup as claimed in claim 2, wherein said vanadium salt d) comprising phosphorus ligands is selected from the group consisting of trialkyl phosphates, and dialkyl phosphates with alkyl chains comprising between 2 and 20 carbon atoms.

4. The (meth)acrylic syrup as claimed in claim 1, wherein the tertiary amine e) is chosen from N,N-dimethyl-p-toluidine (DMPT), N,N-dihydroxyethyl-p-toluidine (DHEPT), N,N-diethyl-p-toluidine (DEPT) and para-toluidine ethoxylate (PTE).

5. The (meth)acrylic syrup as claimed in claim 1, wherein the liquid peroxide compound c) is an organic peroxide comprising 2 to 30 carbon atoms, chosen from hydroperoxides, ketone peroxides and peroxyesters.

6. The (meth)acrylic syrup as claimed in claim 5, wherein the peroxide compound is a hydroperoxide chosen from: tert-butyl hydroperoxide, monohydroperoxide, para-methane hydroperoxide, tert-amyl hydroperoxide and cumene hydroperoxide.

7. The (meth)acrylic syrup as claimed in claim 1, wherein the constituent monomers of the syrup comprise between 0 and 5 parts by weight of aromatic vinyl monomer.

8. The (meth)acrylic syrup as claimed in claim 7, wherein the aromatic vinyl monomer is not styrene.

9. The (meth)acrylic syrup as claimed in claim 1, wherein the constituent monomers of the syrup comprise between 0 and 5 parts by weight of multifunctional monomers.

10. The (meth)acrylic syrup as claimed in claim 1, wherein the constituent monomers of the syrup comprise futhermore between 0 and 5 parts by weight of oligomers bearing methacrylate functionalities.

11. The (meth)acrylic syrup as claimed in claim 1, wherein said syrup has a dynamic viscosity with a value within the range from 50 mPa.s to 5000 mPa.s.

12. A fibrous substrate impregnated with the (meth)acrylic syrup of claim 1, said fibrous substrate consisting of long fibers, the fibers of which have a length ratio of at least 1000.

13. A process for polymerizing a viscous liquid (meth) acrylic syrup as claimed in claim 1, said syrup being a two-component system comprising a first component resulting from the mixing of compounds a), b), d) and e) and a second component comprising the initiating compound c), said process consisting in mixing the first and second component of the two-component system less than 10 minutes before injection into a mold or impregnation of a fibrous substrate.

14. A process for manufacturing structured mechanical parts or articles, wherein said process comprises the following steps:
 a) impregnating a fibrous substrate with a viscous liquid (meth)acrylic syrup as claimed in claim 1,
 b) polymerizing said viscous liquid (meth)acrylic syrup impregnating said fibrous substrate.

15. The process as claimed in claim 14, wherein the impregnation of the fibrous substrate in step a) is performed in a closed mold.

16. The process as claimed in claim 14, wherein step a) of impregnating a fibrous substrate and step b) of polymerization are performed in a closed mold.

17. The process as claimed in claim 14, wherein the process is chosen from resin transfer molding and infusion.

18. The process as claimed in claim 14, wherein the temperature of the polymerization in step b) is below 120° C.

* * * * *